US006577778B1

(12) United States Patent
Wu et al.

(10) Patent No.: US 6,577,778 B1
(45) Date of Patent: Jun. 10, 2003

(54) METHOD AND APPARATUS FOR INTERPOLATING A DIGITAL IMAGE

(75) Inventors: Tung-Hai Wu, Tai Li (TW); Jen-chung Weng, Hsinchu (TW); Jia-der Hsieh, Hsinchu (TW); Tsung-yi Tseng, Li Kang (TW)

(73) Assignee: Myson Century, Inc., Hsin Chu (TW)

( * ) Notice: Subject to any disclaimer, the term of this patent is extended or adjusted under 35 U.S.C. 154(b) by 0 days.

(21) Appl. No.: 09/493,030

(22) Filed: Jan. 27, 2000

(51) Int. Cl.$^7$ .............................. G06K 9/32; G09G 5/00
(52) U.S. Cl. ...................... 382/300; 345/606; 345/472; 345/660; 358/525
(58) Field of Search ................................ 382/298, 299, 382/300, 283, 155, 156, 173, 176, 198, 199, 205, 210, 237, 233, 250, 254, 256, 260, 263, 264, 266; 345/660–671, 698, 699, 606–610; 358/525; 708/208, 290

(56) References Cited

U.S. PATENT DOCUMENTS

| 5,579,418 | A | * | 11/1996 | Williams et al. ............. 382/300 |
| 5,953,465 | A | * | 9/1999 | Saotome ..................... 382/300 |
| 5,986,635 | A | * | 11/1999 | Naka et al. .................. 345/716 |
| 5,991,464 | A | * | 11/1999 | Hsu et al. .................... 382/300 |
| 6,067,071 | A | * | 5/2000 | Kotha et al. ................. 345/698 |
| 6,178,272 | B1 | * | 1/2001 | Segman ....................... 382/298 |
| 6,369,787 | B1 | * | 4/2002 | Wu et al. ..................... 345/87 |
| 6,389,180 | B1 | * | 5/2002 | Wakisawa et al. .......... 382/298 |

* cited by examiner

Primary Examiner—Bhavesh M. Mehta
Assistant Examiner—Aaron W Carter
(74) Attorney, Agent, or Firm—Birch, Stewart, Kolasch & Birch, LLP

(57) ABSTRACT

A method and apparatus is provided for interpolating a digital image in response to a requested degree of sharpness. An adjusting signal representing the requested degree of sharpness will then be generated. The interpolated pixel data are computed based on a 3 order or 4 order interpolation function for three sampling input pixels with an adjustable weight coefficient representing the selected degree of sharpness. The apparatus of the present invention mainly includes: a control interface, a control unit, a vertical interpolation computation module, and a horizontal interpolation module. The vertical interpolation computation module and the horizontal interpolation module are implemented according to an interpolation function derived by the present invention. The control unit comprises a lookup table built according to a scaling function of the present invention. The vertical scaling factor and the horizontal scaling factor required for the interpolation function can be obtained by looking up the lookup table according to the adjusting signal, and the position of the interpolated pixel. Accordingly, the present invention can control the degree of sharpness without having to implement an additional sharp control circuit.

17 Claims, 8 Drawing Sheets

METHOD AND APPARATUS FOR INTERPOLATING A DIGITAL IMAGE

BACKGROUND OF THE INVENTION

A. Field of the Invention

The present invention relates to a method and apparatus for adjusting the picture quality of a digital image display, especially to the method and apparatus for adjusting the picture quality of a liquid crystal display (LCD) in response to a requested degree of sharpness by providing a 3 order or 4 order interpolation function.

B. Description of the Prior Art

For digital display devices, such as Liquid Crystal Display (LCD), Digital Micro-mirror Device (DMD), plasma display, if their resolutions or image frame rates are different from that of the source image, then they will need an image scaler for interpolation and frame rate conversion. Image up-scaling or down-scaling means the change in the image resolution. For up-scaling an image, the position and gray levels of interpolated pixels must be computed and inserted to the position determined for the interpolated pixels. The newly interpolated pixels are closely related to their neighboring pixels. The relationship between an interpolated pixel and its neighboring pixels is represented by a weight to distance function. Such relationship is defined as an interpolation function. The newly interpolated pixels can be computed by a convolution computation based on the interpolation function and the sampling input pixels. Moreover, the picture qualities of the digital image are determined by the interpolation function applied thereto.

Refer to FIG. 1 for showing the structure of a control board of the LCD. It mainly includes a LCD monitor 11, an image scaler 12, and an Analog to Digital Converter 13. The Analog to Digital Converter 13 is for receiving the analog input data from a host computer and then converting it into digital image signals. In general, the gray levels of a pixel can be represented by 8 bits. The image scaler 12 is responsible for up-scaling or down-scaling the image size, and the frame rate conversion. The resultant interpolated image output is then shown on the LCD monitor 11.

Refer to FIG. 2 for illustrating the method for resizing a source image. When the image is scaled up, the input of the image scaler 12 is 8 pixels while output of the image scaler 12 will be 16 pixels. In that case, the positions of the input pixels 21 are not in one-to-one correspondence with the output pixels 22. Thus, the interpolated pixels must be inserted into the source image to provide a smooth continuity on the digital image output.

The technology of interpolation determines the picture quality of the digital image generated by the image scaler. Theoretically, the number of sampling input pixels and the orders of an interpolation function are proportional to the performance of the effects generated. However, in practice, the most commonly used method is to determine the interpolated pixel data based on 2 or 3 sampling input pixels.

Refer to FIG. 3 for showing a figure of the scaling factor based on three sampling input pixels. The gray levels of the interpolated pixel Y(x) can be computed from the A, B, C sampling input pixels. The gray levels of Y(x) can be obtained from the following interpolation function:
For $-0.5 \leq x \leq 0.5$, $$Y(x)=F(x) \times A+G(x) \times B+(1-F(x)-G(x)) \times C; \quad (1)$$

where

B represents the sampling input pixel closest to the interpolated position,

A and C represent the sampling input pixels on the left and right sides of B, x represents the position of the interpolated pixel relative to the position of B. And F(x) and G(x) are scaling functions for computing the scaling factors for the interpolation function.

There are two interpolation methods most commonly used in the arts, namely, Linear Interpolation method and Near Neighborhood method. The figure of the scaling factor following Near Neighborhood method is illustrated in FIG. 4. The scaling factors can be obtained by the following equation:
For $-0.5 \leq x \leq 0.5$, $$F(x)=0;$$

$$G(x)=1.$$

The advantage of the Near Neighboring method is that the contrast of the image is pleasing and the circuit design following the Near Neighboring method is simple. However, its disadvantage is that the interpolated image output cannot be scaled up evenly.

For comparison, the figure of the scaling factor F(x), G(x) according to Linear Interpolation method is illustrated in FIG. 5. The scaling factors of F(x), G(x) can be obtained by:
For $-0.5 \leq x \leq 0$, $$G(x)=1+x;$$

$$F(x)=-x.$$

For $0 \leq x \leq 0.5$, $$G(x)=1-x;$$

$$F(x)=0.$$

In general, the picture quality generated by Linear Interpolation method is better than that of Near Neighborhood method. The interpolated image output can be scaled up evenly. However, for the images with strong contrast, such as text, the boundary of the image will be blurred if interpolated following the Linear Interpolation method.

Thus, it is a critical issue for the technology of the image scaler about how to maintain the picture quality of an image after resizing, and how to simplify the circuit design for the interpolation function in hardware/firmware. Moreover, the conventional LCD monitor does not provide functions for adjusting the degree of sharpness. It is desirable to provide a function for users to manually adjust the degree of sharpness of the source image.

SUMMARY OF THE INVENTION

Accordingly, it is an object of the present invention to provide a method and apparatus for adjusting the picture quality of a digital image by dynamically adjusting a weight coefficient required for the 3 order or 4 order interpolation functions derived by the present invention. Consequently, the sharpness of the image can be flexibly adjusted. The circuitry design can also be simplified, thereby to reduce the manufacturing cost.

In an aspect of the present invention, the apparatus of the present invention mainly includes: a control interface, a control unit, a vertical interpolation computation module, and a horizontal interpolation module. The control interface generates an adjusting signal in response to a requested degree of sharpness. The vertical interpolation computation module and the horizontal interpolation module are implemented according to an interpolation function derived by the present invention. The control unit comprises a lookup table built according to the scaling functions of the present invention. The lookup table stores pre-calculated vertical scaling factors and horizontal scaling factors of an interpolated function defined by $Y(x)=F(x) \times (A-C)+G(x) \times (B-C)+C$. The scaling functions $F(x)$ and $G(x)$ are defined by $F(x)=ax^3+x^2-(2+a) \times x/4$, $G(x)=-2x^2+1$ for a 3 order interpolation function. The vertical interpolation computation module computes the interpolated pixel data from three sampling input pixels according to the scaling factors output of the control unit. After the vertical interpolation procedure is finished, the resultant image data is sent to the horizontal interpolation module. Then, the horizontal interpolation module computes the interpolated pixel data on the resultant image output data after vertical interpolation according to the scaling factors output from the control unit. After completing the horizontal interpolation, the interpolated image data will be shown on the digital image display.

Another aspect of the present invention provides a method for adjusting the picture quality of the digital display device. The method includes the following steps: first, establish a lookup table for storing pre-calculated vertical scaling factors and horizontal scaling factors of an interpolation function defined by $Y(x)=F(x) \times (A-C)+G(x) \times (B-C)+C$. The scaling functions $F(x)$ and $G(x)$ are defined by $F(x)=ax^3+x^2-(2+a) \times x/4$, and $G(x)=-2x^2+1$ respectively for 3 order scaling functions. The scaling functions $F(x)$ and $G(x)$ can also be substituted by a 4 order scaling function:

$$F(x)=(2a-4)x^4+(1-a)x^3+(2-a/2)x^2+(a-3)/4;$$

and $$G(x)=-4(a-2)x^4+(a-4)x^2.$$

Then, select a desired degree of sharpness and generate a weight coefficient a in response to the desired degree of sharpness. After that, determine a vertical scaling factor and a horizontal scaling factor by looking up the lookup table in response to the weight coefficient a. Then, calculate a vertical interpolated pixel data based on every three sampling input pixels from a source image according to the vertical scaling factor and generate a vertical interpolated image output. And after that, calculate a horizontal interpolated pixel data on the vertical interpolated image output and generate a resultant horizontal interpolated image output according to the horizontal scaling factor. Finally, display the resultant horizontal interpolated image output after the source image has been completely interpolated.

BRIEF DESCRIPTION OF THE DRAWINGS

These and other objects and advantages of the present invention will become apparent by reference to the following description and accompanying drawings wherein.

DETAILED DESCRIPTION OF THE PREFERRED EMBODIMENTS

To solve the above mentioned problems, the present invention provides a control interface on the digital image display, such as Liquid Crystal Display (LCD), for adjusting the degree of sharpness of the source image according to a weight coefficient a. The most significant difference between the present invention and that of the prior art is that the value of the weight coefficient a can be dynamically changed according to the desired degree of sharpness requested by a user. The control interface can be implemented by hardware, software, or firmware in a manner known to those skilled in the arts.

The picture quality of the resultant image output using the conventional near neighborhood method or the linear interpolation method can be improved by modifying the interpolation function adopted by the prior arts. Accordingly, the present invention derives an improved interpolation function from the above mentioned equation (1). According to a preferred embodiment of the present invention, a 3 order interpolation function can be derived by the following steps: Let the scaling functions $F(x)$ and $G(x)$ be $$F(x)=a \times x^3+f_2 \times x^2+f_1 \times x+f_0,$$

$$G(x)=g_3 \times x^3+g_2 \times x^2+g_1 \times x+g_0.$$

To prevent the location of the interpolated pixel from shifting away, the scaling function $G(x)$ must be symmetric with respect to Y axis, i.e. $G(x)=G(-x)$.

Let $x=0$, $Y=B$, we can obtain:

$$G(0)=1;$$

$$F(0)=0.$$

To provide a 0 order continuity, the scaling functions of $G(x)$ and $F(x)$ will be:

$$G(1/2)=1/2,$$

$$F(-1/2)=1/2,$$

$$F(1/2)=0.$$

Figure 1:
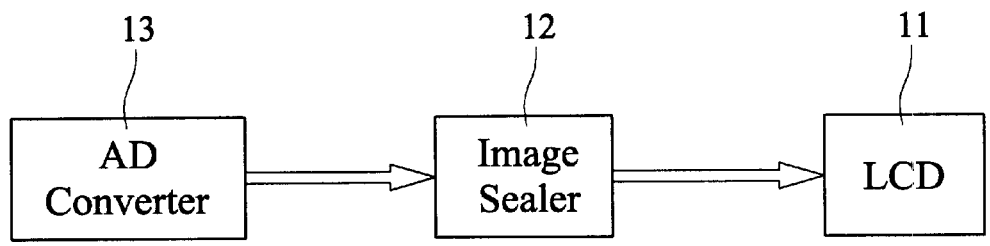
FIG. 1 is a schematic diagram showing the structure of a control board of a conventional LCD.
Figure 2:
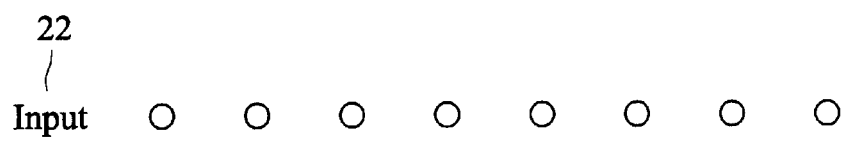
FIG. 2 is a schematic diagram illustrating the resizing of a digital image.
Figure 3:
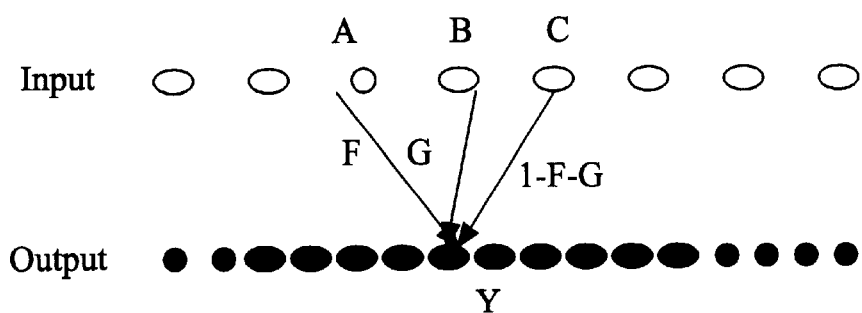
FIG. 3 is a schematic diagram showing the interpolation method based on three sampling input pixels.
Figure 4:
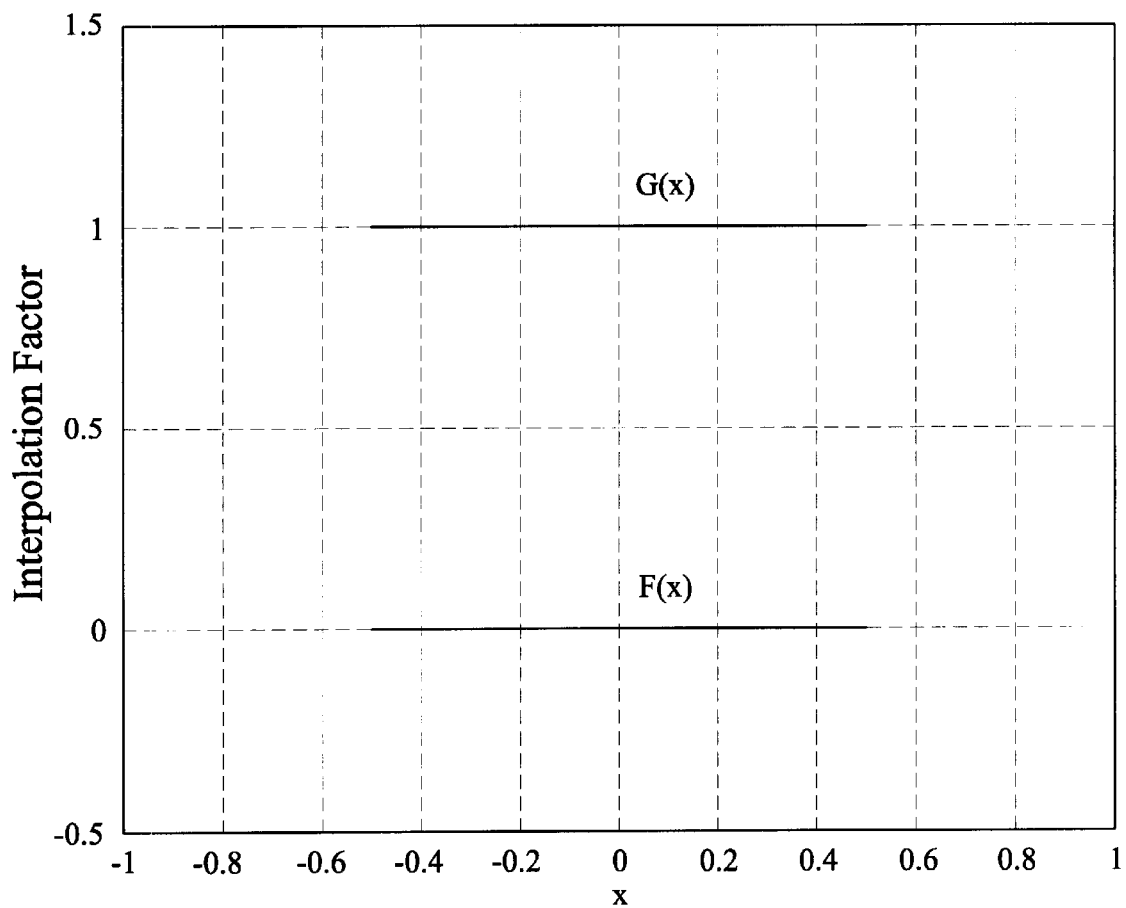
FIG. 4 is a figure of the scaling factor according to a conventional near neighborhood method.
Figure 5:
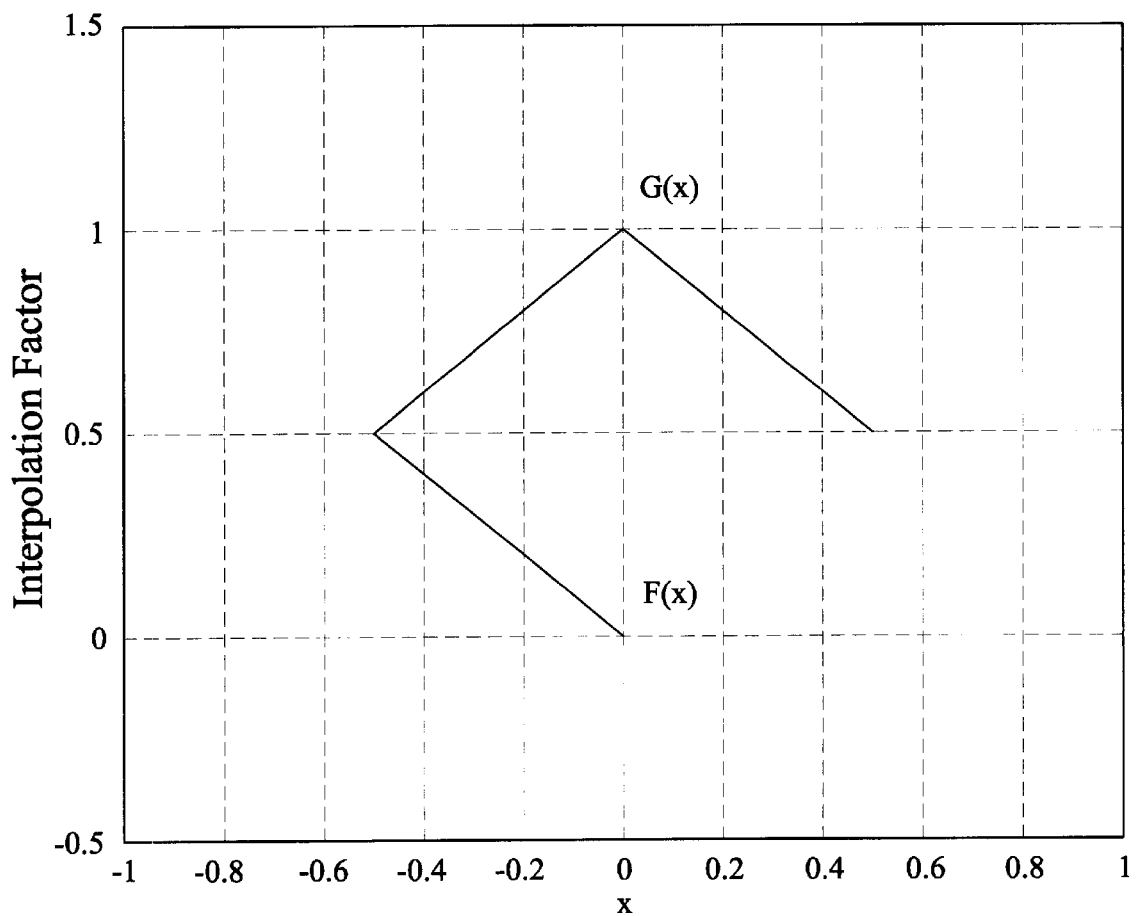
FIG. 5 is a figure of the scaling factor according to a conventional linear interpolation method.
Figure 6:
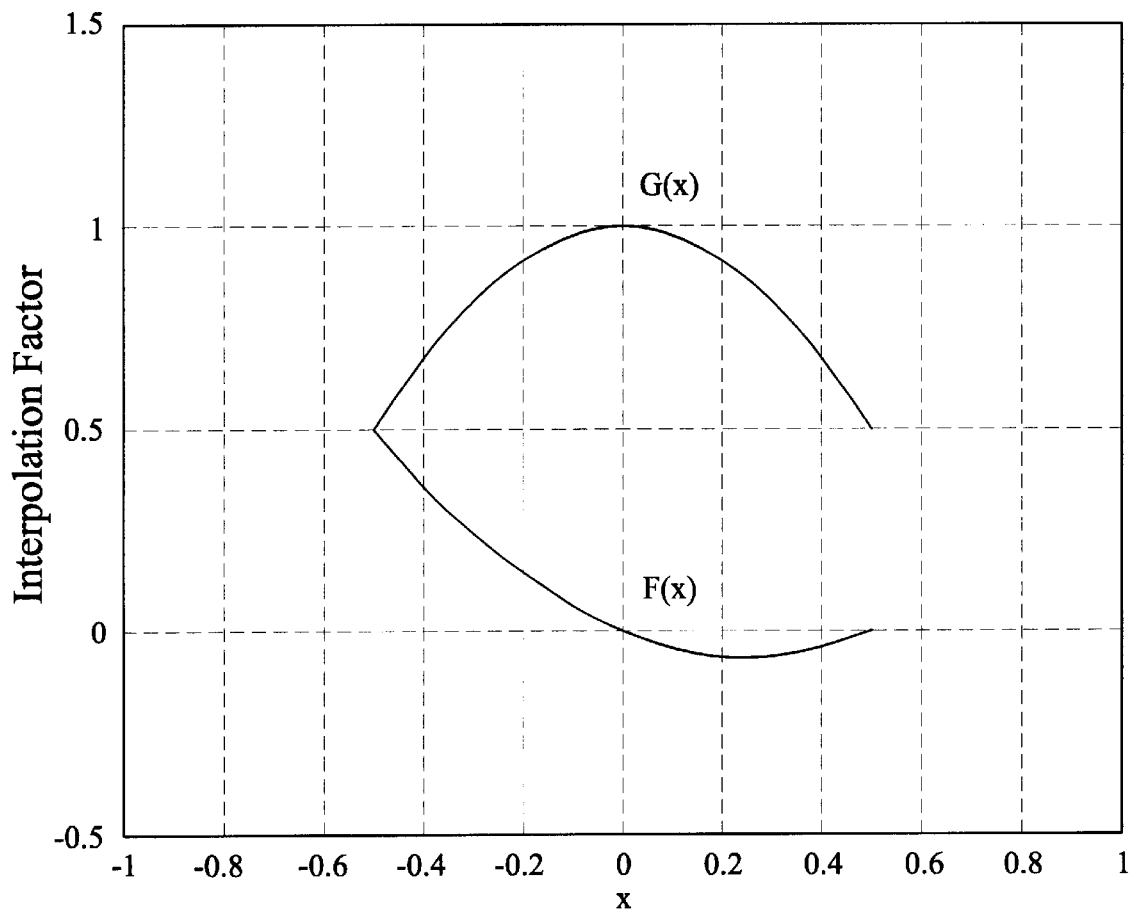
FIG. 6 is a figure of the scaling factor according to a 3 order interpolation function of a preferred embodiment of the present invention.

Accordingly, the result of the scaling functions of $F(x)$ and $G(x)$ derived will be:

$$F(x)=ax^3+x^2-(2+a) \times x/4;$$

$$G(x)=-2x^2+1;$$

where a represents the weight coefficient ranging from 0 to 1. When $a=0$, the smoothness of the interpolated image output will be fully enhanced. Moreover, the contrast of the interpolated image output decreases as the value of a increases. Thus, the figure of the interpolation factor according to the 3 order interpolation function is illustrated in FIG. 6.

According to another preferred embodiment of the present invention, a 4 order interpolation function can also be derived from the equation (1). First, the interpolation functions of F(x) and G(x) can be derived by:

Let $F(x)=f_4 \times x^4+f_3 \times x^3+f_2 \times x^2+f_1 \times x+f_0;$ $G(x)=g_4 \times x^4+g_3 \times x^3+g_2 \times x^2+g_1 \times x+g_0.$ To prevent the position of the interpolated pixel from shifting away, the scaling function G(x) must be symmetric with respect to Y axis, i.e. G(x)=G(−x).
Let x=0, Y=B, we can obtain:

$G(0)=1;$ $F(0)=0.$

To provide a 0 order continuity, the scaling functions of G(x) and F(x) will be:

$G(1/2)=1/2,$ $F(-1/2)=1/2,$ $F(1/2)=0.$

For 1 order continuity, the interpolation function will be:

$Y^1(-1/2)=a(B-A);$ $Y^1(1/2)=a(C-B).$

Figure 7:
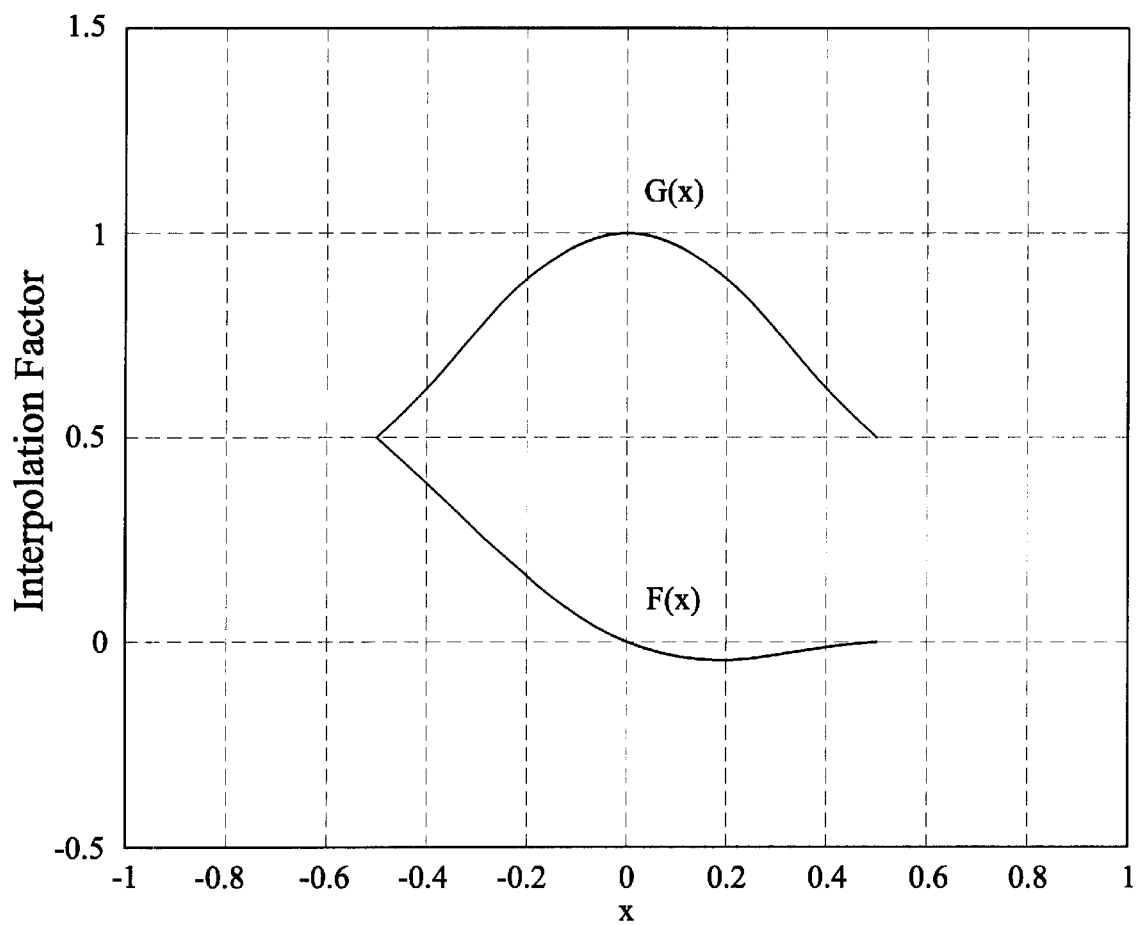
FIG. 7 is a figure of the scaling factor according to a 4 order interpolation function of a preferred embodiment of the present invention.

Accordingly, we can derive the coefficients of each term of the scaling functions F(x) and G(x) as:

$F(x)=(2a-4)x^4+(1-a)x^3+(2-a/2)x^2+(a-3)/4;$ $G(x)=-4(a-2)x^4+(a-4)x^2;$ wherein a represents the weight coefficient which is larger or equal to 1. When a=1, the smoothness of the interpolated image output will be fully enhanced. The contrast of the interpolated image output decreases as the value of a increases. Accordingly, the figure of the interpolation factor according to the 4 order interpolation function can be illustrated in FIG. 7.

After obtaining the interpolation functions modified as described above, the degree of sharpness for a digital image can be dynamically changed according to the method of the present invention:

Step 1: providing a control interface for a user to select a desired degree of sharpness and then generating a weight coefficient a in response to the user's selection.

Step 2: sequentially computing a vertical interpolated pixel data in response to the weight coefficient a on three sampling input pixels from a source image according to the 3 order scaling function or the 4 order scaling function.

Step 3: Then, sequentially computing a horizontal interpolated pixel data on the interpolated image data output of step (2) according to the 3 order scaling function or the 4 order scaling function.

The 3 order or 4 order scaling functions are for the interpolation function of:

$Y(x)=F(x) \times (A-C)+G(x) \times (B-C)+C;$ where Y(x) represents the value of the interpolated pixel. The scaling functions F(x) and G(x) for the 3 order interpolation function are defined by:

$F(x)=ax^3+x^2-(2+a) \times x/4;$ $G(x)=-2x^2+1.$

On the other hand, the scaling functions F(x) and G(x) for the 4 order interpolation function will be:

$F(x)=(2a-4)x^4+(1-a)x^3+(2-a/2)x^2+(a-3)/4;$ $G(x)=-4(a-2)x^4+(a-4)x^2.$

For the convenience of computation and the simplification of circuit design, the value of the scaling factors can be precalculated according to the scaling functions of F(x) and G(x) and then stored in a lookup table.

Figure 8:
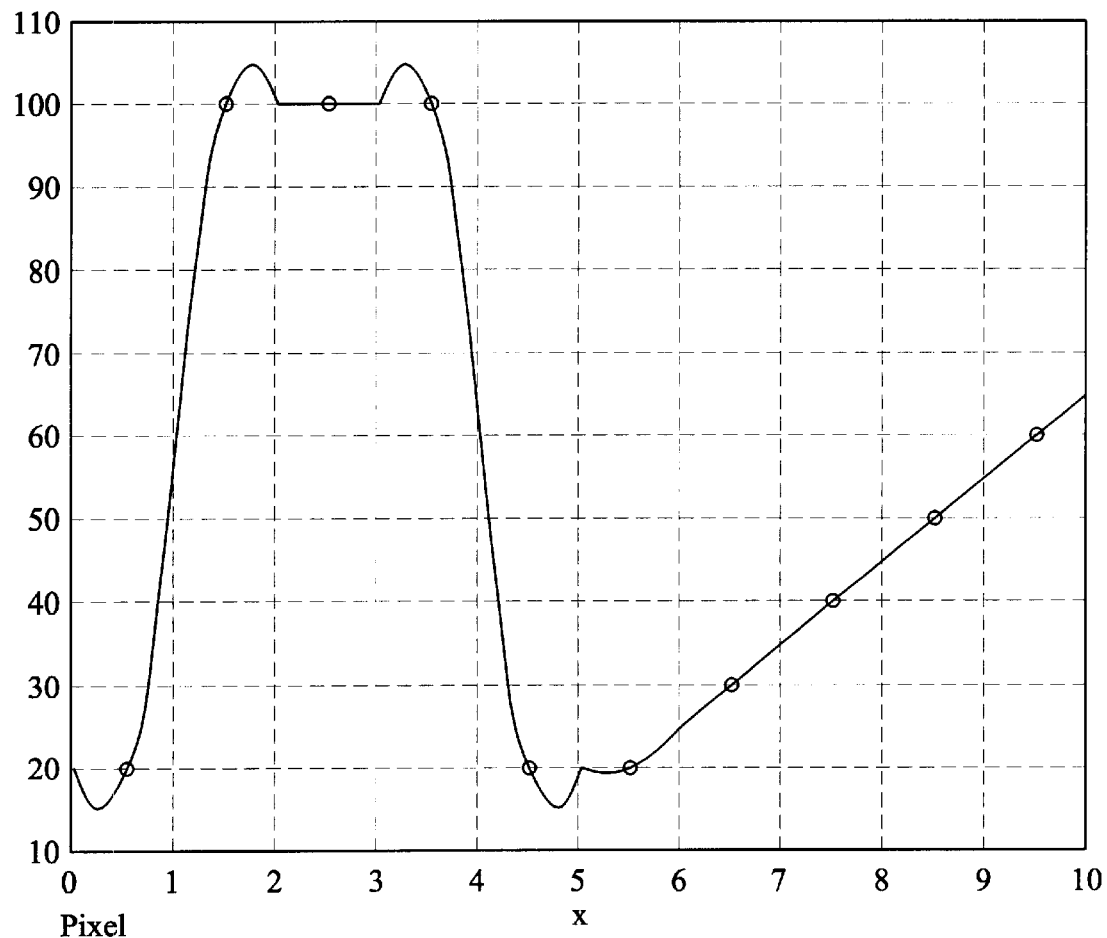
FIG. 8 is an exemplary figure of the scaling factor according to the 3 order interpolation function or the 4 order interpolation function of the preferred embodiment of the present invention.

With reference to FIG. 8, it shows the figure of the scaling factor according to the method of the present invention by using 10 sampling input pixels. From the illustration of FIG. 8, it would be obvious to show the advantages of the present invention. The interpolated image output according to the present invention can enhance or preserve the image sharpness and thus is better than the conventional Linear Interpolation method. Comparing to the conventional Near Neighborhood method, the interpolation image output according to the present invention can also reduce the contrast noise. Moreover, by providing an adjustable weight coefficient a, the present invention can save the cost on implementing an extra circuit for adjusting the degree of sharpness.

The interpolation functions derived above can be implemented by hardware. The interpolation function (1) can be simplified and modified as:

$$Y(x)=F(x) \times (A-C)+G(x) \times (B-C)+C. \qquad (2)$$

Figure 9:
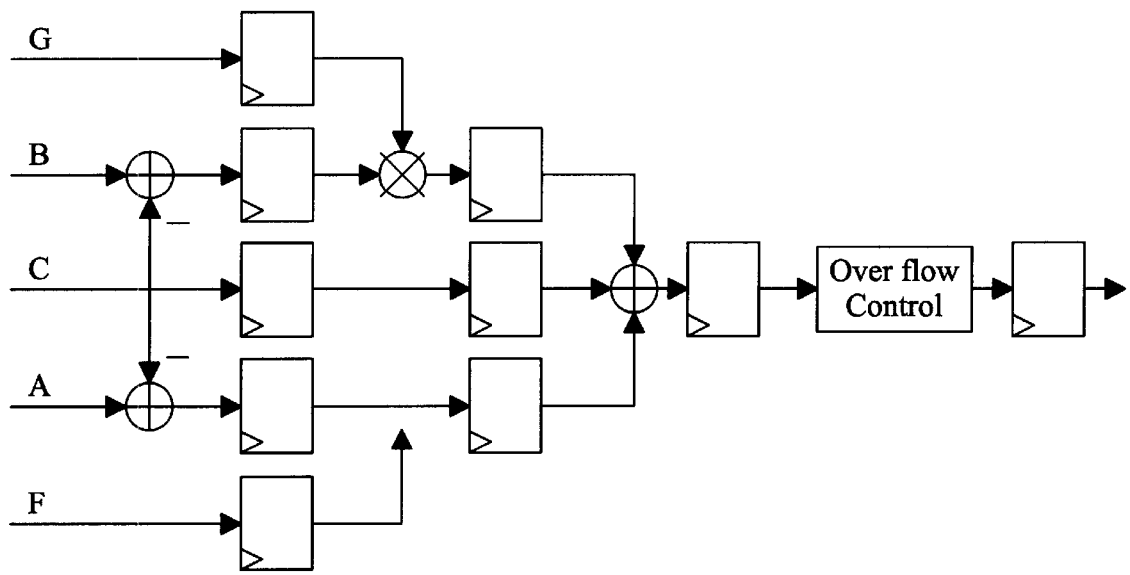
FIG. 9 is a circuit block diagram showing the interpolation computation module implemented according to the 3 order interpolation function or the 4 order interpolation function of the preferred embodiment of the present invention.

According to the interpolation function (2), a circuit design for computing the interpolated pixel data is illustrated in FIG. 9. The circuit consists of only three adders and two multipliers.

Figure 10:
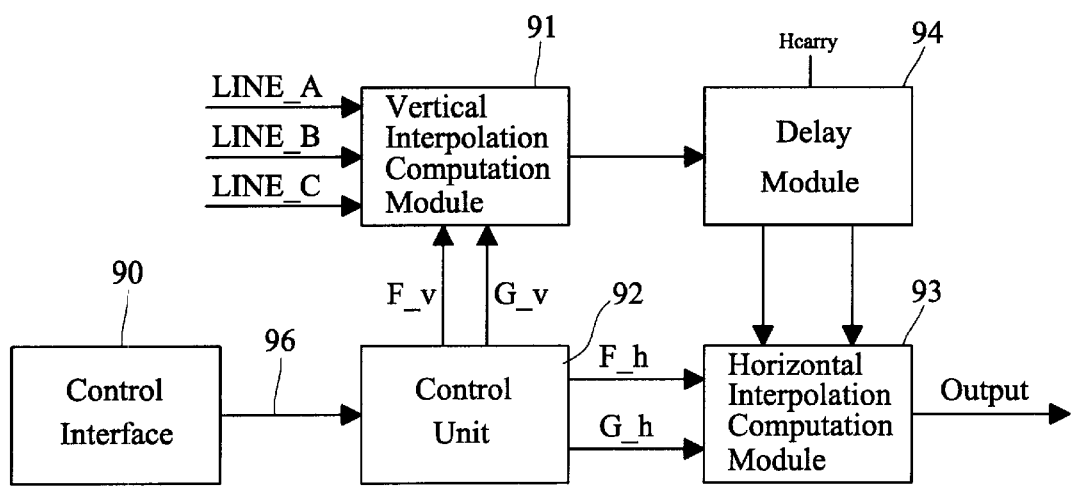
FIG. 10 is a circuit block diagram showing the image scaler implemented according to the 3 order interpolation function or the 4 order interpolation function of the preferred embodiment of the present invention.

Since the interpolation function is performed based on Cartesian coordinates, so the interpolation procedure performs vertical interpolation first and then performs the horizontal interpolation on the source image. The general structure of the image scaler is illustrated in FIG. 10. With reference to FIG. 10, the user can select a degree of sharpness from a control interface 90 for adjusting the degree of sharpness on the source image. In response to the selection of the user, an adjusting signal 96 is generated and input to the control unit 92. The control interface 90 can be implemented by software, hardware, or firmware.

Since the interpolation procedure is executing vertical interpolation first, so the sampling input pixels A, B, C are read sequentially from the A, B, C lines of the source image and input to the vertical Interpolation computation module 91. The vertical interpolation computation module 91 computes the interpolated pixel data Y(x) according to the interpolation function (2). The scaling functions of F(x) and G(x) are then obtained from the control unit 92.

The control unit 92 determines the vertical scaling factor by looking up a lookup table in response to the adjusting signal 96, and then outputs vertical scaling factors F_v, G_v to the vertical interpolation computation module 91. After finishing the vertical interpolation procedure, the resultant output interpolated image will be sent to the horizontal interpolation computation module 93 via a delay module 94.

The horizontal interpolation computation module 93 computes the interpolated pixel data Y(x) on the resultant output interpolated image of the vertical interpolation computation module 91 according to the interpolation function (2). The horizontal scaling factors of F_h, G_h are input from the control unit 92. The horizontal scaling factors are also generated by looking up the lookup table 103. Finally, the resultant interpolated image data will be output to the display after finishing the interpolation procedure.

Figure 11:
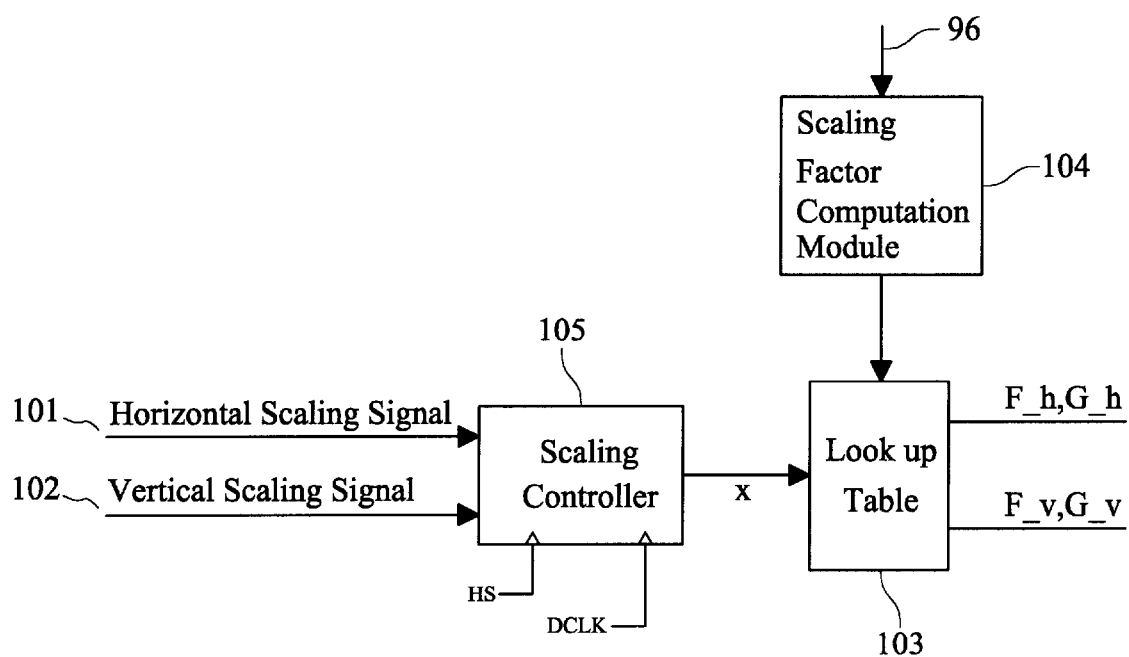
FIG. 11 is a circuit block diagram showing the structure of the control unit of the image scaler according to the preferred embodiment of the present invention.

The control unit 92 can be illustrated more clearly from FIG. 11. The control unit 92 can generate the horizontal and vertical scaling factors of F(x) and G(x) by looking up the lookup table 103. After the user selects a degree of sharpness for the image output, the weight coefficient a representing the degree of sharpness will be input to the scaling factor computation module 104 to be computed according to the scaling functions of F(x) and G(x). The weight coefficient a is between 0 and 1. The scaling factor computation module 104 can be implemented by firmware. The scaling function for the 3 order interpolation function will be:

$$F(x)=ax^3+x^2-(2+a)\times x/4;$$

$$G(x)=-2x^2+1.$$

The 3 order scaling function can be substituted by a 4 order scaling function as follows:

$$F(x)=(2a-4)x^4+(1-a)x^3+(2-a/2)x^2+(a-3)/4;$$

$$G(x)=-4(a-2)x^4+(a-4)x^2.$$

Then, the pre-calculated data of the 3 order or 4 order scaling functions can be stored in the lookup table 103. Consequently, the scaling factors can be found easily by reference to the weight coefficient a and the position of the interpolated pixel x. The lookup table 103 can be implemented in the Synchronous Random Access Memory (SRAM).

The position of the interpolated pixel x can be computed by the scaling controller 105 according to the vertical scaling signal 102 and the horizontal scaling signal 101. Since the scaling factors of a correspondent pixel have been pre-calculated and stored in the lookup table 103, so the values of the horizontal scaling factor F_v, G_v and the values of the vertical scaling factor F_h, G_h of the interpolated pixel x can be found by simply looking up the lookup table 103. Thus, with the lookup table 103 and the scaling factor computation module 104, the circuit design can be simplified. Moreover, since the present invention can provide a better effect of sharpness, so it does not require an additional circuitry for sharpness adjustment.

To sum up, the apparatus and method of the present invention can improve the picture quality of a digital image by providing an adjustable weight coefficient for a 3 order or 4 order interpolation function. Consequently, the present invention can reduce the contrast noise while preserving or enhancing image sharpness on the destination image output. The present invention also can enhance smoothness in fringe regions. Moreover, the present invention can control the desired degree of sharpness without the implementation of an extra circuitry.

While this invention has been described with reference to an illustrative embodiment, this description is not intended to be construed in a limiting sense. Various modifications and combinations of the illustrative embodiment, as well as other embodiments of the invention, will be apparent to persons skilled in the art upon reference to the description. It is therefore intended that the appended claims encompass any such modifications or embodiments.

What is claimed is:

1. Apparatus for interpolating a digital image in response to a selected degree of sharpness, comprising:

control interfacing means for generating an adjusting signal in response to a selected degree of sharpness;

a scaling factor computation module coupled to said control interfacing means for generating a value of said weight coefficient in response to said adjusting signal;

a control unit coupled to said scaling factor computation module for determining a vertical scaling factor and a horizontal scaling factor by looking up a lookup table in response to said weight coefficient, wherein said lookup table storing pre-calculated vertical scaling factors and horizontal scaling factors of an interpolation function Y(x) defined by Y(x)=F(x)×(A−C)+G(x)×(B−C)+C, said scaling functions F(x) and G(x) defined by F(x)=ax³+x²−(2+a)×x/4, G(x)=−2x²+1, said B representing an input pixel nearest an interpolated pixel, said A and said C representing neighboring pixels on the right side and the left side of said B, said x representing a position of an interpolated pixel relative to the coordinates of said B, a representing a weight coefficient;

a vertical interpolation computation module coupled to said control unit for calculating a vertical interpolated pixel data on every three input pixels from a source image according to said vertical scaling factor from said control unit and generating a vertical interpolated result;

a horizontal interpolation computation module coupled to said control unit for calculating a horizontal interpolated pixel data on said vertical interpolated result and generating a resultant interpolated image data according to said horizontal scaling factor from said control unit; and display means for displaying said resultant interpolated image data.

2. The apparatus as claimed in claim 1, wherein said weight coefficient a is ranging from 0 to 1.

3. The apparatus as claimed in claim 1, wherein said vertical interpolation computation module and said horizontal interpolation computation module are operated by means of Y(x)=F(x)×(A−C)+G(x)×(B−C)+C.

4. The apparatus as claimed in claim 1, wherein said lookup table is stored in a Synchronous Random Access Memory (SRAM).

5. The apparatus as claimed in claim 1, wherein said display means is a Liquid Crystal Display.

6. The apparatus as claimed in claim 1, wherein said control interfacing means can be implemented in software, hardware or firmware.

7. The apparatus as claimed in claim 1, wherein said scaling functions of F(x) and G(x) can be replaced with a 4 order scaling function of:

$$F(x)=(2a-4)x^4+(1-a)x^3+(2-a/2)x^2+(a-3)/4;$$

$$G(x)=-4(a-2)x^4+(a-4)x^2.$$

8. The apparatus as claimed in claim 7, wherein said weight coefficient a is larger or equal to 1.

9. The apparatus as claimed in claim 1, wherein said scaling functions F(x) and G(x) can be implemented by firmware.

10. A method for interpolating a digital image in response to a requested degree of sharpness, comprising the steps of:

establishing a lookup table for storing pre-calculated vertical scaling factors and horizontal scaling factors of an interpolated function defined by $Y(x)=F(x)\times(A-C)+G(x)\times(B-C)+C$, said scaling functions $F(x)$ and $G(x)$ defined by $F(x)=ax^3+x^2-(2+a)\times x/4$, $G(x)=-2x^2+1$, said B representing an input pixel nearest an interpolated pixel, said A and said C representing neighboring pixels on the right side and the left side of said B, said x representing the position of an interpolated pixel relative to said B, a representing a weight coefficient;

selecting a desired degree of sharpness and generating a weight coefficient a in response to said desired degree of sharpness;

determining a vertical scaling factor and a horizontal scaling factor by looking up said lookup table in response to said weight coefficient a;

calculating a vertical interpolated pixel data on every three input pixels from a source image according to said vertical scaling factor and generating a vertical interpolated result;

calculating a horizontal interpolated pixel data on said vertical interpolated result and generating a resultant interpolated image data according to said horizontal scaling factor; and displaying said horizontal interpolated result after said source image has been interpolated.

11. The method as claimed in claim 10, further comprising the step of:

storing said lookup table in a Synchronous Random Access Memory.

12. The method as claimed in claim 10, wherein said horizontal interpolated value is performed by an interpolation function of $Y(x)=F(x)\times(A-C)+G(x)\times(B-C)+C$.

13. The method as claimed in claim 10, wherein said vertical interpolated value is performed by an interpolation of $Y(x)=F(x)\times(A-C)+G(x)\times(B-C)+C$.

14. The method as claimed in claim 10, wherein said weight coefficient a is ranging between 0 and 1.

15. The method as claimed in claim 10, wherein said step of selecting a requested degree of sharpness can be implemented by software, hardware or firmware.

16. The method as claimed in claim 10, wherein said scaling functions $F(x)$ and $G(x)$ can be computed by means of:

$$F(x)=(2a-4)x^4+(1-a)x^3+(2-a/2)x^2+(a3)/4;$$

$$G(x)=-4(a-2)x^4+(a-4)x^2.$$

17. The method as claimed in claim 16, wherein said weight coefficient a is larger or equal to 1.

* * * * *